May 29, 1962 M. STAUNT 3,036,804
CONTROL UNIT MOUNTINGS FOR AIR DRIVEN DENTAL HANDPIECES
Filed Nov. 24, 1958 4 Sheets-Sheet 1
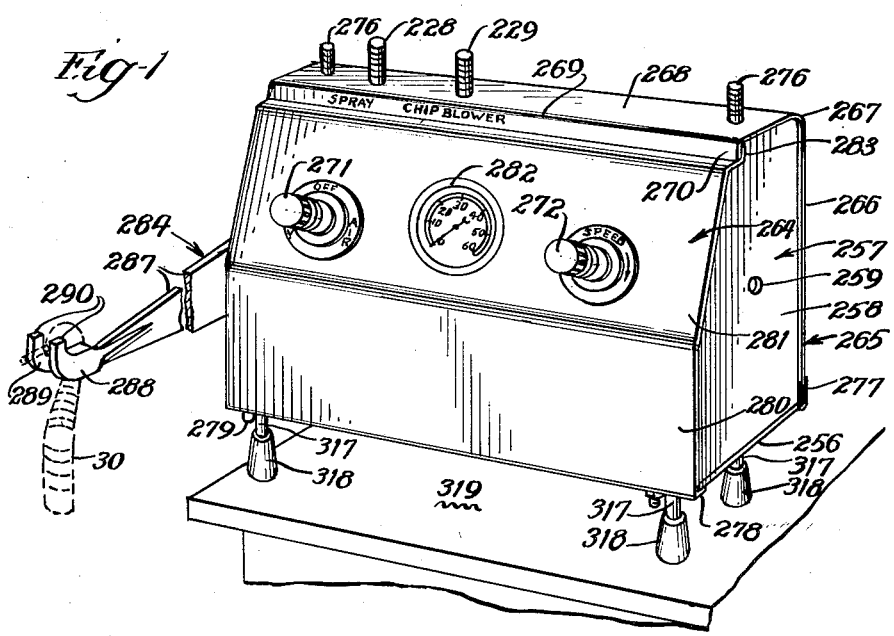
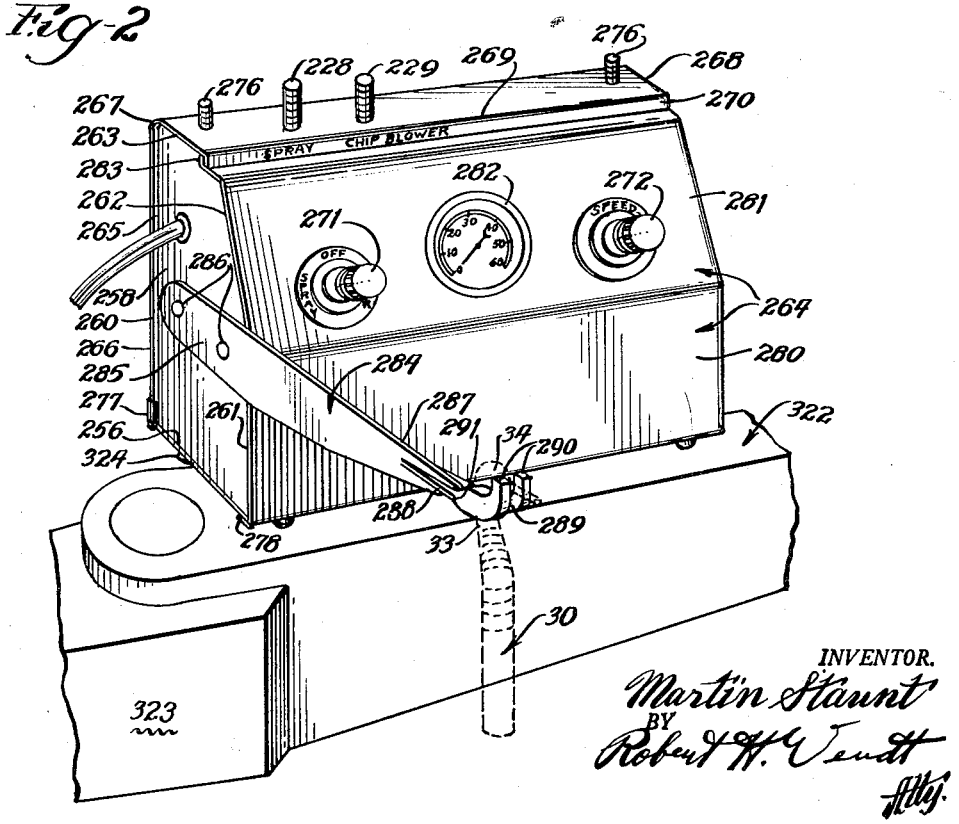
INVENTOR.
Martin Staunt
BY
Robert H. Jevitt
Atty.

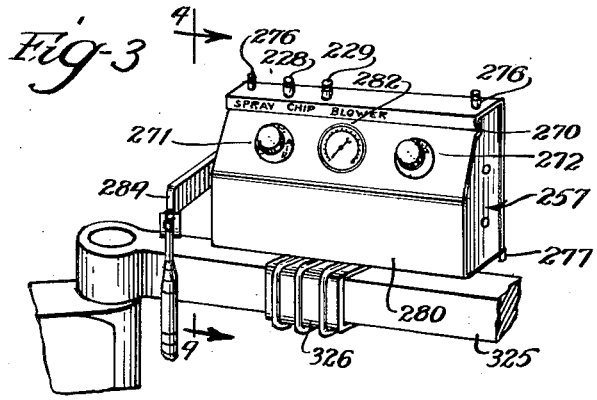
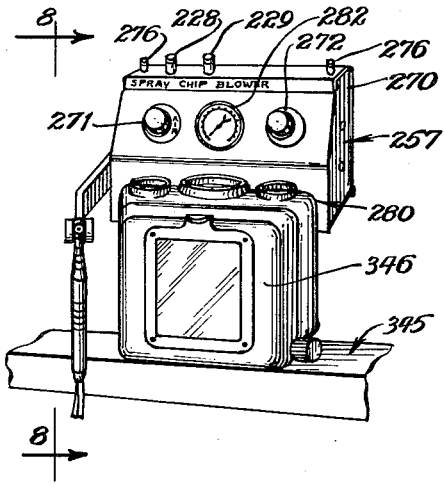
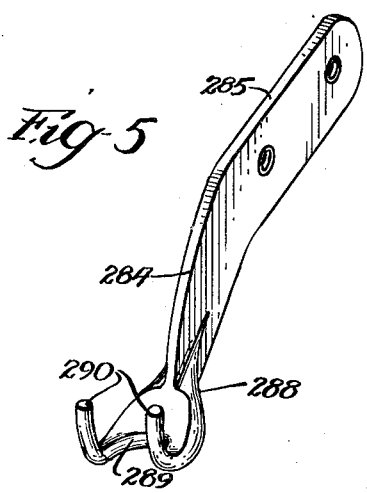
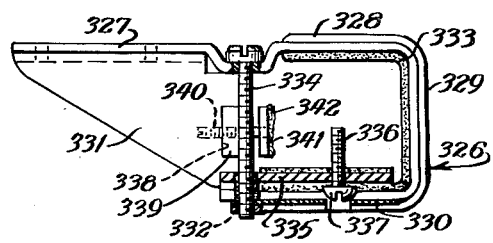
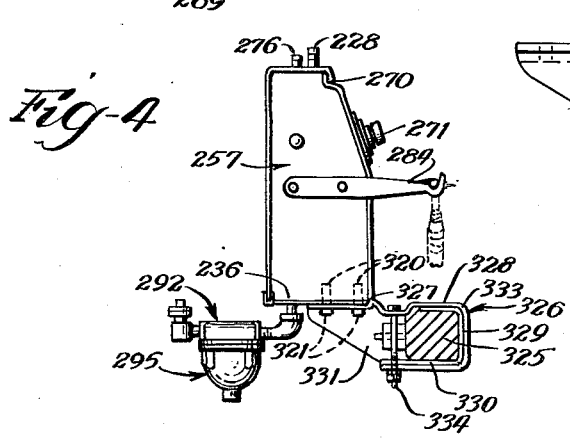

May 29, 1962 M. STAUNT 3,036,804
CONTROL UNIT MOUNTINGS FOR AIR DRIVEN DENTAL HANDPIECES
Filed Nov. 24, 1958 4 Sheets-Sheet 3
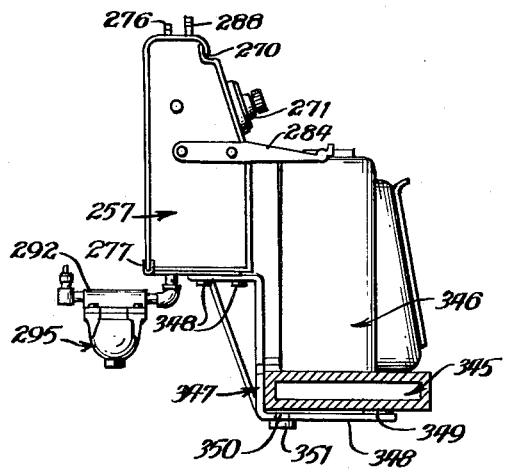
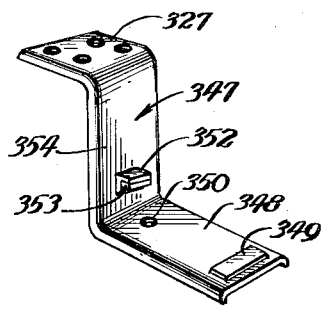
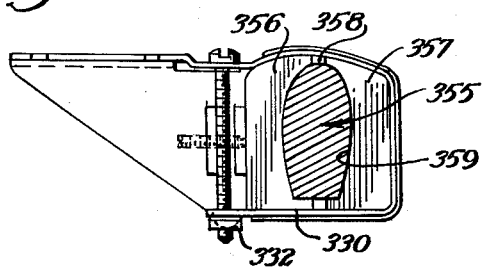
INVENTOR.
Martin Staunt
BY
Robert H. Wendt
Atty.

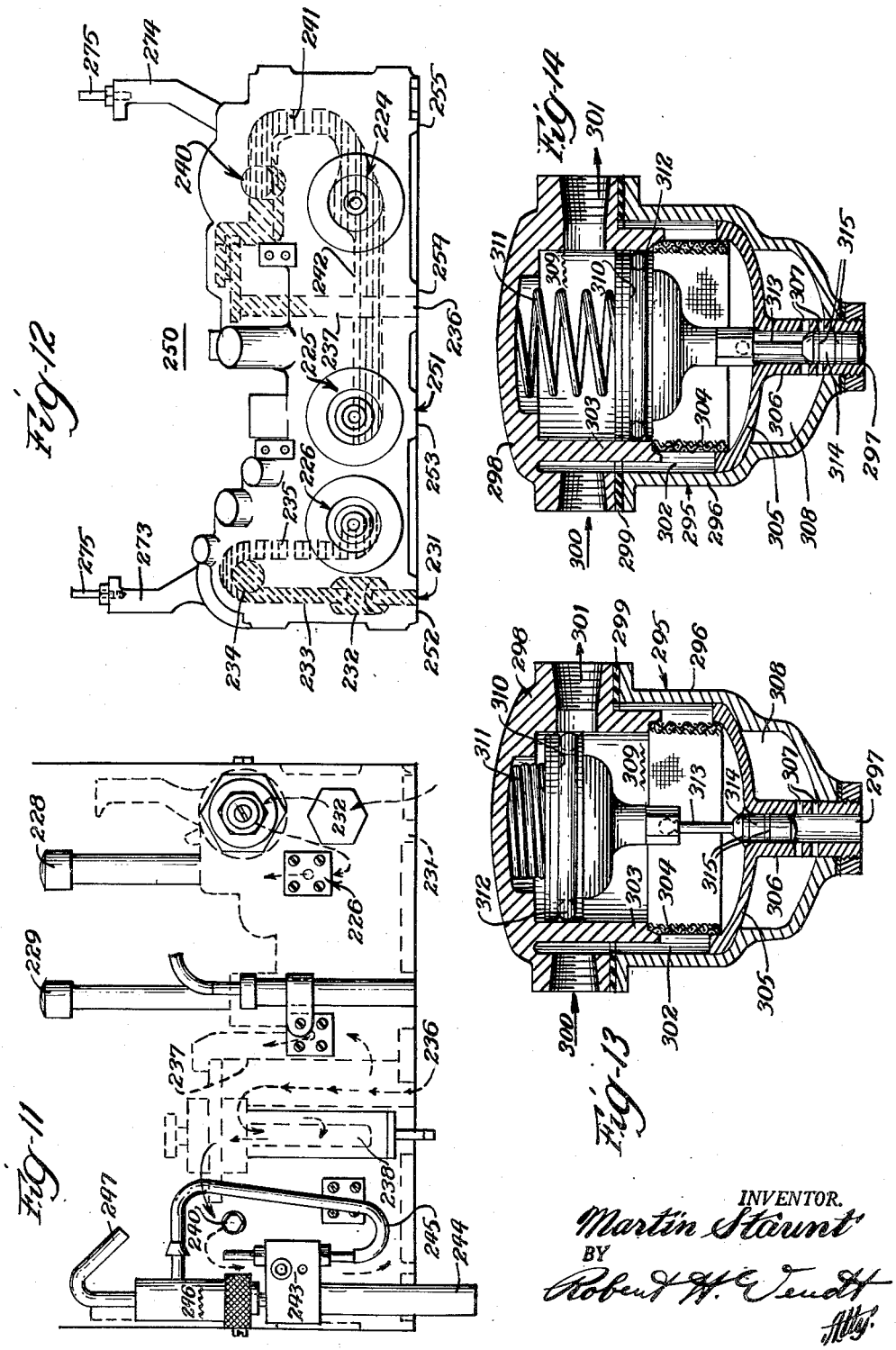

United States Patent Office 3,036,804
Patented May 29, 1962

3,036,804
CONTROL UNIT MOUNTINGS FOR AIR DRIVEN
DENTAL HANDPIECES
Martin Staunt, Des Plaines, Ill.
(4439 W. Rice St., Chicago 51, Ill.)
Filed Nov. 24, 1958, Ser. No. 775,864
3 Claims. (Cl. 248—228)

The present invention relates to control unit mountings for air driven dental handpieces, and is particularly concerned with the housing and mounting of the control units upon various forms of dental stands and arms so that the control unit will be adaptable to all forms of dental stands now on the market.

One of the objects of the invention is the provision of an improved housing for the control unit of an air driven dental handpiece by means of which all of the controlling devices may be located in one unit and disposed in convenient position near to the dentist on the arm of a dental operating unit or stand.

Another object of the invention is the provision of a plurality of forms of supporting brackets by means of which the air driven control unit may be mounted upon arms of different size, shape, and structure.

Another object of the invention is the provision of improved housing construction and improved supporting brackets which are simple, capable of economical manufacture, which keep the parts of the control unit readily accessible for repair or replacement, and which present a convenient and ornamental appearance for the assembly.

Other objects and advantages of the invention will be apparent from the following description and the accompanying drawings, in which similar characters of reference indicate similar parts throughout the several views.

Referring to the drawings, of which there are four sheets,

FIG. 1 is a view in perspective of a control unit for air driven dental handpieces of the table model type;

FIG. 2 is a fragmentary view in perspective of a second type adapted to be mounted upon the pivoted arm of a dental stand;

FIG. 3 is a fragmentary view in perspective of the control unit and its mounting bracket for a different form of pivoted arm;

FIG. 4 is a fragmentary side elevational view taken on the plane of the line 4—4 of FIG. 3, looking in the direction of the arrows;

FIG. 5 is a view in perspective of the handpiece supporting arm;

FIG. 6 is a fragmentary sectional view of a modified mounting bracket provided with a pair of adjustable felt pads for gripping the supporting arm;

FIG. 7 is a front view in perspective of a modified mounting behind a container for dental instruments;

FIG. 8 is a fragmentary end elevational view, showing the arm in section, of a modification, taken on the plane of the line 8—8 of FIG. 7;

FIG. 9 is a view in perspective of the bracket used in FIG. 7;

FIG. 10 is a fragmentary sectional view, showing another form of mounting arm and a modified bracket provided with suitably shaped plastic clamping members, the shape of which may be varied to clamp many different forms of arms;

FIG. 11 is a rear elevational view of the control unit assembly and casting;

FIG. 12 is a front elevational view of the control unit casting;

FIG. 13 is a vertical axial sectional view, taken through the air drier unit, which depends from the housing, as shown in FIG. 4, at the air inlet, for the purpose of removing moisture from the air line that might occur due to condensation in the conduit from the compressor, the drier being shown in the closed position;

FIG. 14 is a similar view with the drier shown in the open position.

Referring to FIGS. 11 and 12, the control unit for providing a suitable supply of air, lubricant, and water for the air driven dental handpiece preferably has all of its necessary parts secured to a single casting, indicated in its entirety by the numeral 250 in FIG. 12. This aluminum casting provides support for all of the instruments and controlling devices.

This casting has a stable base 251 with plane surfaces on a plurality of forwardly and rearwardly extending foot flanges 252, 253, 254, and 255, which are provided with the proper openings and ports and threaded bores for receiving various inlet and outlet pipes and screw bolts which secure the casting to the bottom plate 256 of the housing, indicated at 257 (FIG. 1).

The bottom plate 256 is integrally secured to the two similar end plates 258, which extend upward at right angles and are secured to the casting 250 by suitable screw bolts 259. The outline of the end plates includes a straight rear edge 260, a straight front edge 261, a diagonal portion 262, and a top outline 263, all of which fits the front and rear cover plates 264 and 265.

The rear cover plate 265 comprises a rectangular vertical panel 266, having an easy curve 267 at the top integrally joined to a top portion 268 extending horizontally and turned downward at 269 with a downward flange 270 that aids in holding the front plate 264.

The flange 270 supports indicia for the controlling devices, such as the word "Spray" below the knob 228 and the words "Chip Blower" below the knob 229. The knob 272 actuates a valve in the air supply line for controlling the speed of the air driven handpiece by varying the pressure and volume of air; and the housing has the word "Speed" above the knob 272. Knob 271 controls a selector switch; and the housing has the indicia "Off" above it, and "Spray" and "Air" at the left and right of it.

The top flange 268 of the rear cover 265 has a pair of apertures for passing the needle valve knobs 228 and 229, which control needle valves in the casting 250 for regulating the supply of water and the supply of heated air for blowing away chips.

The casting 250 has two upwardly extending arms 273, 274, having upwardly extending screw bolts 275 threaded at both ends for securement to the casting and for receiving knurled cap nuts 276, which secure the top flange 268 of the rear cover 265 to the casting.

The depending rear flange 266 preferably has a rubber or plastic U shaped edge cover 277, extending along its lower edge to be pressed against the edge of the bottom plate 256 for effecting a resilient closure and preventing vibration.

The front cover 264 comprises a rectangular plate provided with a narrow retainer flange 278 extending at right angles at its bottom to engage under the bottom plate 256, to which it is secured by screw bolts 279 passing through the flange 278 and bottom plate 256 into the casting feet.

The front cover has a vertical rectangular portion 280 and a diagonally extending portion 281, which is provided with apertures for passing the selective switch knob 271, the air pressure gauge 282, and the speed control knob 272.

At its upper edge the front plate 264 is curved backwardly to fit the end plates 258, and has an upwardly turned retaining flange 283, which is caught behind the depending flange 270 of the back cover, and is secured thereby.

The housing is preferably made of stainless steel; and at one end it carries the handpiece supporting arm 284 (FIG. 2), comprising a molded plastic arm, which has its rear end 285 secured to the end plate of the housing by a pair of screw bolts 286 passing through the housing, and having nuts on the inside.

The handpiece retaining arm 284 has its forwardly extending portion 287 tapered and provided with a laterally widened end 288, terminating in a rearwardly extending slot 289. This slot is wide enough to receive the neck of a dental handpiece of the air driven type covered by my application, Case 31, Ser. No. 789,751, filed January 28, 1957, for Air Driven Dental Handpieces.

The dental handpiece has a transverse head 34 supported by a narrow neck 33; and the neck is adapted to be inserted through the slot 289 behind a pair of upwardly extending lugs 290 on the hand piece supporting arm 284.

The handpiece head 34 rests on a pair of upwardly extending ribs 291 behind the lugs 290.

The control unit casting 250 is provided with cored conduits extending from the water inlet 231 through the water filter 232 upwardly through conduit 233 to a cored valve seat for a water control valve 234 actuated by knob 228. This regulates the pressure and amount of water supplied.

From the valve 234 a cored conduit 235 extends downward to a solenoid actuated valve 226, which controls electrically the supply of water by means of the selective switch 271, turning on the water when the switch knob 271 is at "Spray."

The air supply inlet is at 236 (FIG. 12); and the casting 250 has an upwardly extending conduit 237 which conducts the air to an air filter unit 238 for removing dust and other particles from the air before it is conducted laterally to the air pressure regulator valve 240, which is controlled by the speed control knob 272. This valve controls the volume and pressure of the air both for blowing away chips and for driving the air driven handpiece.

The amount of air for the chip blower is further controlled by the needle valve actuated by the knob 229. From the pressure regulator valve 240 a cored conduit 241 in the casting extends downward to the solenoid valve 224, which turns the air drive on or off as controlled by the selective switch knob 271.

Another cored conduit 242 extends laterally to a solenoid valve 225, which is adapted to turn on or off the air supply for the chip blower responsive to the selective switch 271 and responsive to a further foot control switch (not shown).

From the air filter unit 239 the air goes to a lubricant atomizer 243, having a supply of lubricant in a reservoir 244 for forming an oil mist, which is discharged through conduit 245 into a lubricant separator 246, where the lubricant in the form of mist passes out of the conduit 247 with air for driving the handpiece, while the droplets of lubricant drop in the separator 246 to be returned to the reservoir 244.

The air supply, which enters at 236, passes through the water separator 292 for removing water, which may have condensed in the lines from the air compressor; and the structure of such a separator is shown in FIGS. 13 and 14.

The water separator includes a cast metal housing 295 having a lower portion 296 with an outlet 297 for discharging drops of water. The housing 295 has a cast metal cover 298 secured to the bottom 296 by screw bolts (not shown) and a gasket 299; and the cover is provided with an air inlet 300 and air outlet 301.

The air inlet 300 leads to an annular space 302 surrounding a depending integral skirt 303, which is grooved to receive a porous felt filtering element 304 of cylindrical shape.

The felt filtering element extends downward to a partition member 305, which carries a valve tube 306 extending out of the outlet 297. The valve tube 306 has a plurality of laterally extending conduits 307, which are open in the position of FIG. 13, when the air pressure is on, thus permitting water, which gathers in the space 308, to discharge through the opening 297.

The outlet 301 communicates with the cylindrical chamber 309 in the housing 296 above the piston 310, which is urged downward by coil spring 311. The piston 310 carries a rubber O ring 312 and has the depending universally mounted valve stem 313 with a sliding piston valve 314 on its lower end provided with a plurality of O rings 315.

When the air pressure is turned off, the spring 311 urges the piston 310 downward, as shown in FIG. 14, closing the lower valve opening 297 so that no air can leak out, and water is retained; but when the air pressure is turned on, the pressure in the chamber 309 urges the piston 310 upward to the position shown in FIG. 12, closing the outlet 297 against egress of air; but permitting any water in the chamber 308 to run out the outlet 297.

The water separator 292 effectively removes from the air supply all water formed by condensation or other means in the air line prior to its entry into the control unit.

Referring to FIG. 1, the control unit may be provided with a plurality of legs 317 threaded into the base casting 250 and provided with rubber feet 318 for resting on a table 319 in the table model. The bottom of the housing and casting is also provided with a plurality of threaded bores 320 (FIG. 4) for receiving screw bolts 321, which may pass through various brackets to secure the control unit to various types of pivoted arms 322 carried by the dental stand 323.

In the model of FIG. 2 the housing is secured to the arm 322 by a suitable angle of bracket 324.

Referring to FIG. 3, the pivoted arm 325 is provided with a U shaped metal bracket 326 of the type shown in FIG. 4. This U shaped bracket has a horizontally extending attaching flange 327 receiving the screw bolts 321, which are threaded into the bottom of the control unit casting 250.

The attaching 327 carries an integral U shaped flange having an upper portion 328, a yoke 329, and a bottom flange 330. A U shaped brace flange 331 is carried by the attaching flange 327 for increasing its rigidity; and the U shaped brace flange has a pair of depending tongues 332 anchored in apertures in the lower flange 330 of the bracket.

The U shaped bracket of FIG. 4 preferably has felt pads 333 adhesively secured to the inside of the U shaped member 328, 329, 330; and the pivoted arm 325 is clamped between these pads by a pair of through bolts 334 (FIG. 4), which extend through the flanges 328 and 330 and are provided with nuts, clamping the bracket on the pivoted arm 325 in FIGS. 3 and 4.

Referring to FIG. 6, the same U shaped bracket 326 may be provided with a lower adjustable plate 355 actuated by a screw bolt 336, which is threaded into the plate 335 and has its head 337 bearing on an aperture in the lower flange 330 to drive the plate 35 up into clamping position on smaller arms.

The bracket 331 may also have a pair of rectangular guide apertures 338 for receiving a base plate 339 based on the bracket 331, and having a screw bolt 340 threaded into the base plate 339 and pivotally mounted in a clamping plate 341, having a felt pad 342.

Thus in FIG. 6 clamping plates 342 and 335 may be moved at right angles to each other to clamp a smaller pivoted arm than that shown in FIGS. 3 and 4.

Referring to FIGS. 7, 8, and 9, these are views utilizing the bracket of FIG. 9 for mounting the control unit on a pivoted arm 345 behind a container 346 for dental instruments. In this case the arm 345 is rectangular; and therefore the bracket 347 has a horizontally extending portion 348 with a felt pad 349 and an aperture 350 for a single screw bolt 351.

The bracket has a forwardly extending flange 352 punched out of it and provided with a felt pad 353 engaging the top of the arm 345; and it has an upwardly extending portion 354 extending past the container 346 and provided with the attaching flange 327.

A plurality of screw bolts 348 secure the control unit 257 to the attaching flange 327.

Referring to FIG. 10, this is a mounting bracket which is similar to FIGS. 3 and 4, but is adapted to be used for mounting on pivoted arms 355 of various sizes and shapes.

For this purpose the U shaped bracket contains a pair of molded plastic clamping members 356, 357 having their clamping surfaces 358, 359 suitably shaped to fit in pivoted arm 355. By varying the shape of the clamping members 356, 357 the U shaped bracket may be caused to clamp a pivoted arm having a shape complementary to the clamping surfaces 358, 359.

It will thus be observed that I have invented a plurality of different mounting constructions for the control unit of an air driven dental handpiece on the pivoted arms carried by various types of dental stands and units.

By means of these mountings and brackets the control unit may be installed on almost any type of dental unit which is now on the market, placing all of the controls for air and water in a convenient position for the dentist and also provided with a supporting arm for holding the dental handpiece when it is not in use.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A control unit mounting bracket for supporting a dental control unit on the supporting arm of a dental stand, comprising a U shaped metal bracket having a yoke and a pair of parallel leg flanges adapted to embrace supporting arms of varying size and shape, one of the legs having an extension serving as an attaching flange for supporting a control unit, a U shaped brace having parallel leg flanges and a yoke, said yoke being secured below said attaching flange, and said leg flanges being secured to the other leg of said bracket, the leg flanges of said bracket having two pairs of aligned apertures for receiving two clamping screw bolts on opposite sides of said brace, two threaded bolts located in said apertures to extend across the rear side of an arm embraced by the bracket, and a nut, each bolt drawing the leg flanges of the bracket to adjust the leg flanges vertically with respect to said arm, a base plate carried by said brace and extending vertically between said bolts, said base plate being located with its ends in complementary slots in each of the brace flanges, an adjusting screw bolt threaded in said base plate and pivotally supporting a vertical clamping plate, said clamping plate being located inside the bracket to exert pressure against said supporting arm to secure the bracket on the arm.

2. A control unit mounting bracket according to claim 1 having a lower adjustable clamping plate guided above the lower bracket flange by apertures receiving said two screw bolts, said lower clamping plate having a threaded bore receiving a round head screw bolt, said round head engaging in an aperture in the lower bracket flange without passing through said aperture to permit a screwdriver to be inserted through the aperture to drive the lower plate up into clamping position against the supporting arm.

3. A control mounting bracket according to claim 1, including a pair of plastic clamping blocks, said blocks providing a clamping assembly receivable between the legs of the bracket and engaging the yoke, said clamping blocks having inner clamping surfaces shaped to be complementary to the outside surfaces of said supporting arm, said vertical clamping plate and its screw bolt exerting pressure against said plastic clamping blocks to clamp the bracket on the supporting arm of a shape complementary to the clamping surfaces of the blocks.

References Cited in the file of this patent
UNITED STATES PATENTS

| | | |
|---|---|---|
| 533,445 | Denison | Feb. 5, 1895 |
| 2,650,990 | Woodruff | Sept. 1, 1953 |
| 2,659,491 | Williams | Nov. 17, 1953 |
| 2,662,521 | Armstrong et al. | Dec. 15, 1953 |
| 2,855,672 | Franwick et al. | Oct. 14, 1958 |
| 2,896,893 | Oliver | July 28, 1959 |
| 2,940,715 | Schultz et al. | June 14, 1960 |

OTHER REFERENCES

Stephens: "Air Turbine Handpiece Motors," British Dental Journal, June 19, 1956, pages 345–351. See pages 347–348. (Copy in Div. 55.)

Ritter: Century Unit, Operators Manual, copyright 1957, cover and page 3, FIGURE 4 relied upon. (Copy in Division 55.)